Figure 1:
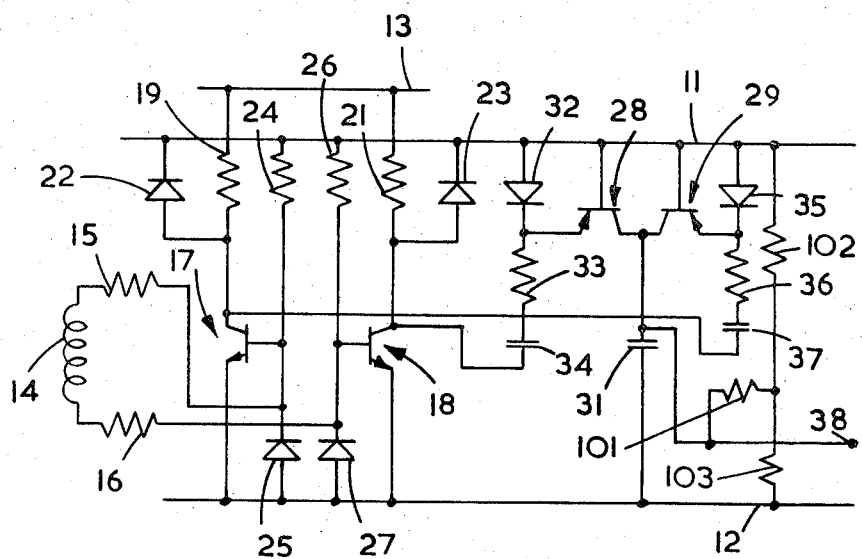

United States Patent [19]
Sutton

[11] 3,811,082
[45] May 14, 1974

[54] BRAKING SYSTEMS FOR VEHICLES

[75] Inventor: Christopher John Sutton, Belgrave, England

[73] Assignee: Joseph Lucas (Electrical) Limited, Birmingham, England

[22] Filed: Oct. 12, 1972

[21] Appl. No.: 297,069

[30] Foreign Application Priority Data
Oct. 22, 1971  Great Britain.................. 99308/71

[52] U.S. Cl................................ 318/383, 303/21 P
[51] Int. Cl............................................. B60t 8/12
[58] Field of Search...................... 318/52, 362–366, 318/372, 383, 369; 307/9, 10; 303/21 P

[56] References Cited
UNITED STATES PATENTS

| | | | |
|---|---|---|---|
| 3,697,139 | 10/1972 | Elliott et al...................... | 303/21 P |
| 3,727,992 | 4/1973 | Bowler et al..................... | 303/21 P |
| 3,659,907 | 5/1972 | Gunsser et al................... | 318/52 X |

Primary Examiner—Bernard A. Gilheany
Assistant Examiner—W. E. Duncanson, Jr.
Attorney, Agent, or Firm—Holman & Stern

[57] ABSTRACT

A braking system for a vehicle has an arrangement for releasing the vehicle brakes automatically in order to prevent skidding. When the vehicle is travelling over a rough surface, such as a cobbled road, the rotational deceleration of the wheel can result in releasing of the brakes without wheel skid, and delay means is provided for preventing this possibility.

3 Claims, 3 Drawing Figures

3,811,082

BRAKING SYSTEMS FOR VEHICLES

This invention relates to braking systems for vehicles, of the kind in which the brakes of a vehicle are released automatically in order to prevent skidding.

The usual arrangement in systems of this kind is to release the brakes from a wheel when the rotational deceleration of the wheel exceeds a predetermined value.

However, it has been found that on very bad road surfaces, for example cobbled roads, a situation can arise in which the brakes are permanently released even though a wheel is not skidding. This results from the fact that on a cobbled road, a wheel will decelerate as it travels up the cobblestone, and accelerate as it travels down the cobblestone. If the vehicle is being braked at the time, then the mean rotational speed of the wheel will be decreasing, and so there will be a deceleration signal from the wheel. However, superimposed upon this signal will be acceleration and deceleration signals at a much greater frequency as a result of the acceleration and deceleration caused by the cobblestones. Not only are these acceleration and deceleration signals at a very high frequency, but they are at a substantial magnitude certainly sufficient to cause the brakes to be released from the wheel. Thus, a situation can arise in which the mean deceleration is such that the wheel is not likely to slip, but nevertheless the brakes are released as a result of the signal resulting from the cobblestones. Moreover, because the brakes on a vehicle wheel take longer to apply than to release, a situation can quickly be reached in which the brakes are in fact held off permanently, so that the braking effort is lost.

The present invention seeks to overcome this difficulty, and resides in a braking system for a vehicle in which the braking force applied to a wheel is released when the rotational deceleration of the wheel exceeds a predetermined value, and means is provided for ensuring that when the brakes are re-applied to the wheel, they remain on for a predetermined period of time sufficient to prevent permanent release of the brakes when the wheel is not skidding.

Figure 3:
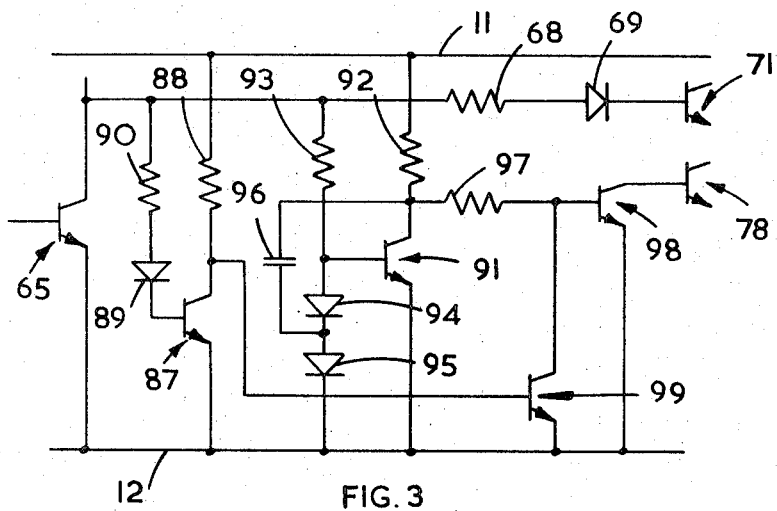
Figure 2:
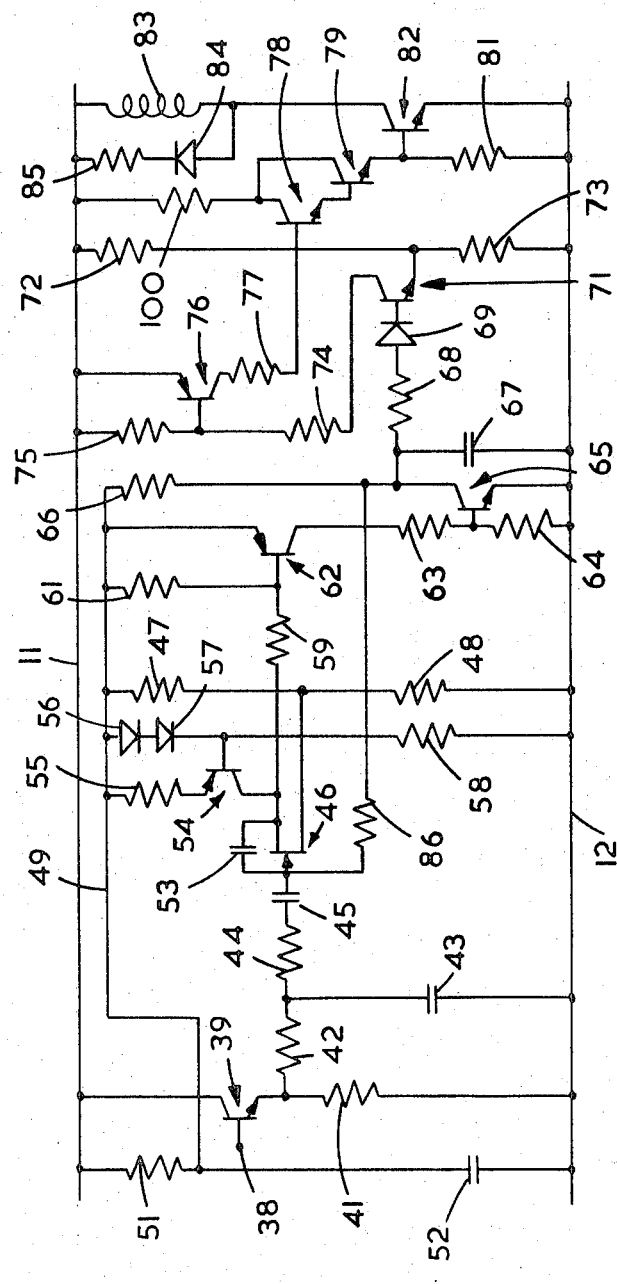

An example of the invention is illustrated in the accompanying drawings, in which FIG. 1 is a circuit diagram illustrating a circuit for producing a signal representing the rotational speed of a wheel, FIG. 2 is a circuit diagram illustrating the circuit for controlling the brakes, and FIG. 3 is a circuit diagram of an inhibiting circuit which prevents unwanted release of the brakes.

Referring first to FIG. 1, there are provided positive and negative supply lines 11, 12 which are provided with power from the battery of a road vehicle, and a further supply line 13 which is at a higher positive potential than the line 11.

Associated with one of the wheels of the vehicle is a pick-up winding 14 in which is generated pulses at a frequency proportional to the rotational speed of the wheel. The way in which the pulses are generated is not important, and can take a variety of forms. For example, the wheel can drive a tooth member which produces the required pulses in the winding 14. The ends of the winding 14 are connected through resistors 15, 16 respectively to the bases of a pair of n-p-n transistors 17, 18 having their emitters connected to the line 12 and their collectors connected through resistors 19, 21 respectively to the line 13. The collectors of the transistors 17, 18 are further connected through diodes 22, 23 respectively to the line 11, the base of the transistor 17 is connected to the lines 11, 12 through a resistor 24 and a diode 25 respectively, and the base of the transistor 18 is connected to the lines 11, 12 through a resistor 26 and a diode 27 respectively.

There are further provided a pair of p-n-p transistors 28, 29 having their bases connected to the line 11 and their collectors interconnected, and connected to the line 12 through a capacitor 31. The collectors of the transistor 28, 29 are further connected through a resistor 101 to the junction of a pair of resistors 102, 103 connected in series between the lines 11, 12. The emitter of the transistor 28 is connected to the line 11 through a diode 32, and to the collector of the transistor 18 through a resistor 33 and a capacitor 24 in series. The emitter of the transistor 29 is connected through a diode 35 to the line 11, and is further connected through a resistor 36 and the capacitor 37 in series to the collector of the transistor 17. The output from the circuit is taken from the collectors of the transistors 28, 29, as indicated by the terminal 38.

As the wheel rotates, the potential at the top of the winding will be alternately positive and negative with respect to the potential at the bottom of the winding 14. With the positive potential at the top of the winding 14, the transistor 18 is off, but the transistor 17 is turned on by current flowing through the resistor 15. Current flows through the diode 35, the resistor 36, the capacitor 37 and the transistor 17 to charge the capacitor 37 with its top plate positive and its lower plate negative.

When the top of the winding 14 is negative with respect to the bottom of the winding 14, then the transistor 17 turns off and the lower plate of the capacitor 37 is connected through the resistor 19 to the line 13, so that the upper plate of the capacitor 37 becomes highly positive, and turns on the transistor 29, whereupon the capacitor 37 discharges into the capacitor 31. The transistor 18 is now conductive, so that current flows through the diode 32, the resistor 33, the capacitor 34 and the transistor 18 to charge the capacitor 34. When the top of the winding 14 again becomes positive with respect to the bottom of the winding 14, then the transistor 17 turns on again, the transistor 18 turns off, and the capacitor 34 is coupled through the resistor 21 to the line 13, so that the capacitor 34 turns the transistor 28 on, permitting the capacitor 34 to discharge into the capacitor 31. Thus, the circuit develops across the capacitor 31 and resistor 101 a voltage which is proportional to the rotational speed of the wheel.

Referring now to FIG. 2, the terminal 38 is connected to the base of an n-p-n transistor 39, the collector of which is connected to the line 11 and the emitter of which is connected through a resistor 41 to the line 12. The resistor 41 is bridged by a resistor 42 and a capacitor 43 in series, and the junction of the resistor 42 and capacitor 43 is connected through a resistor 44 and a capacitor 45 in series to the gate of a field effect transistor 46. The source of the transistor 46 is connected to the junction of a pair of resistors 47, 48 connected in series between a supply line 49 and the line 12, the line 49 being connected to the junction of a resistor 51 and a capacitor 52 connected in series between the lines 11, 12. The drain and gate of the transistor 46 are interconnected through a capacitor 53, and the drain is further connected to the collector of a p-n-p transistor 54 having its emitter connected through a resistor 55 to the line 49. The lines 49, 12 are bridged by a series circuit including a pair of diodes 56, 57 and a resistor 58, and the junction of the diode 57 and resistor 58 is connected to the base of the transistor 54. The collector of the transistor 54 is also connected through a resistor 59 and a resistor 61 in series to the line 49, the junction of the resistors 59, 61 being connected to the base of a p-n-p transistor 62 having its emitter connected to the line 49 and its collector connected through resistor 63, 64 in series to the line 12. The junction of the resistors 63, 64 is connected to the base of an n-p-n transistor 65, the emitter of which is connected to the line 12 and the collector of which is connected through a resistor 66 to the line 49, and through a resistor 86 to the gate of transistor 46.

The collector of the transistor 65 is connected to the line 12 through a capacitor 67, and is further connected through a resistor 68 and a diode 69 in series to the base of an n-p-n transistor 71, the emitter of which is connected to the junction of a pair of resistors 72, 73 connected between the lines 11, 12. The collector of the transistor 71 is connected through a pair of resistors 74, 75 in seris to the line 11, and the junction of the resistors 75, 74 is connected to the base of a p-n-p transistor 76. The transistor 76 has its emitter connected to the line 11 and its collector connected through a resistor 77 to the base of an n-p-n transistor 78, the emitter of which is connected to the base of an n-p-n transistor 79. The collectors of the transistors 78, 79 are interconnected and connected through a resistor 100 to the line 11, and the emitte of the transistor 79 is connected through a resistor 81 to the line 12, and also to the base of an n-p-n transistor 82. The emitter of the transistor 82 is connected to the line 12, and its collector is connected to the line 11 through a solenoid 83 which is bridged by a freewheel diode 84 in series with a resistor 85. The solenoid 83 serves when it is energised to operate a valve for releasing the brakes from the wheel.

As will be described later, the operation of the circuit shown in FIG. 2 is, in certain circumstances, modified by the inhibiting circuit shown in FIG. 3. However, for the moment the arrangement in FIG. 3 will be ignored.

The signal at the terminal 38 is a voltage representing the rotational speed of the wheel. This voltage turns on the transistor 39, which provides an input to an amplifier constituted by the transistors 46, 54, 62 and 65, this amplifier having a feedback path between the collector of the transistor 65 and the emitter of the transistor 46 by way of a resistor 86. The amplifier differentiates the signal received at the terminal 38, and provides at the collector of the transistor 65 a signal representing the rate of change of rotational speed of the wheel. In operation, the conduction of the transistor 54 is controlled by the diodes 56, 57 and the resistor 58, and the transistor 54 serves in conjunction with the transistor 46 to determine the conduction of the transistor 62, which in turn determines the conduction of the transistor 65. The potential at the collector of the transistor 65 will normally be intermediate the potentials of the lines 11, 12, and when the wheel decelerates the potential will approach the potential of the line 11, but when the wheel accelerates will approach the potential of the line 12.

The emitter potential of the transistor 71 is set by the resistors 72, 73, and normally the transistor 71 is non-conductive. In these cirumstances, the transistor 76 receives no base current, and so is off, and the transistors 78, 79 and 82 will also be off so that the winding 83 is not energised, and the brakes are not released from the wheel. However, during deceleration, the potential at the collector of the transistor 65 rises, until at a predetermined rotational deceleration of the wheel, the transistor 71 turns on. The predetermined rotational deceleration is of course chosen to be such that the wheel is about to skid. When the transistor 71 turns on, it turns on the transistor 76, which in turn provides base current to the transistors 78, 79 and 82 to energise the winding 83 and release the brakes from the wheel. When the wheel accelerates again, the potential at the collector of the transistor 65 falls, so that the transistor 71 turns off, turning off the transistors 76, 78, 79 and 82 and de-energising the winding 83 so that the brakes are no longer held off.

The difficulty that can arise if the vehicle is travelling over a bad surface, for example cobbled road, can be appreciated with reference to FIG. 2. As previously explained, with a vehicle travelling over a cobbled road, the wheel will decelerate as it travels up the cobblestones and accelerate as it travels down the cobblestones. Assuming that the vehicle is being braked at the time, then the means rotational speed of the wheel will be decreasing, and so there will be a deceleration signal represented by a predetermined potential at the collector of the transistor 65. However, superimposed upon this signal will be an acceleration and a deceleration signal at a much greater frequency as a result of the acceleration and deceleration caused by the cobblestones. Assuming that the means deceleration is not such that the wheel is likely to skid, then the means potential at the collector of the transistor 65 is not sufficient to turn on the transistor 71. However, the momentary deceleration as the wheel travels up the cobblestone will cause a substantial rise in the potential at the collector of the transistor 65, so turning on the transistors 71, 76, 78, 79 and 82 and releasing the brakes. Of course, as the wheel travels down the cobblestone, it accelerates again and the transistor 71 turns off. Turning off of the transistor 71 turns the transistor 82 off, but the brakes on a vehicle wheel take considerably longer to apply than to release, and so by the time the brakes could be released as a result of the transistor 82 turning off, the wheel will be travelling up a cobblestone again, and so the transistor 82 will be turned on again. The overall result is that the brakes are held off permanently even though the wheel is not actually skidding.

In order to overcome this problem, an inhibiting circuit is employed, and one form of inhibiting circuit is shown in FIG. 3. As can be seen in FIG. 3, the inhibiting circuit is connected to the collector of the transistor 65, and acts on the base of the transistor 78 in the amplifier controlling the winding 83. The inhibiting circuit includes an n-p-n transistor 87 having its emitter connected to the line 12 and its collector connected through a resistor 88 to the line 11, the base of the transistor 87 being connected through a diode 89 and a resistor 90 in series to the collector of the transistor 65. There is further provided an n-p-n transistor 91 having its emitter connected to the line 12 and its collector connected through a resistor 92 to the line 11, the base of the transistor 91 being connected through a resistor 93 to the collector of the transistor 65, and through diodes 94, 95 in series to the line 12, the junction of the diodes 94, 95 being connected through a capacitor 96 to the collector of the transistor 91. The collector of the transistor 91 is also connected through a resistor 97 to the base of an n-p-n transistor 98 having its emitter connected to the line and its collector connected to the base of the transistor 78 seen in FIG. 2. The base of the transistor 98 is also connected to the collector of an n-p-n transistor 99, the emitter of which is connected to the line 12 and the base of which is connected to the collector of the transistor 87.

It will be recalled that the collector potential of the transistor 65 is normally intermediate the potentials of the lines 11, 12, but rises during deceleration and falls during acceleration of the wheel. When the wheel is rotating normally, the transistors 87 and 91 are both turned on by current flowing through the resistors 90 and 93 respectively, and so no base current is provided to either of the transistors 98 and 99, and the capacitor 96 is discharged.

The inhibiting circuit will prevent the brakes from being released only when the transistor 98 conducts, it being understood that when the transistor 98 conducts then any base current supplied to the transistor 7i will be diverted through the collector-emitter of the transistor 98 so that the transistor 78 is non-conductive, and the transistors 79 and 82 in FIG. 2 are both off so that the winding 83 cannot be energised. If the wheel decelerates, the potential at the collector of the transistor 65 rises, but the transistors 87 and 91 remain on, even if the deceleration exceeds the predetermined value and the brakes are released. Thus, during deceleration, the transistor 98 cannot be turned on and so it cannot inhibit the transistor 78. However, when the wheel starts to accelerate again, the collector potential of the transistor 65 falls, and when the acceleration reaches a predetermined level the transistors 87 and 91 turn off. When the transistor 87 turns off, then current flowing through the resistor 88 turns on the transistor 99. When the transistor 91 turns off, then current flowing through the resistor 92 and the diode 95 charges the capacitor 96, but current flowing through the resistor 97 cannot turn the transistor 98 on, because the transistor 99 is conducting.

When the wheel accelerates, the brakes will be reapplied, but when the acceleration of the wheel falls below the predetermined level, the potential at the collector of the transistor 65 rises, and the transistor 87 turns on, removing the base current from the transistor 99. At this stage, the transistor 91 is held off for a predetermined period of time by discharge of the capacitor 96, and during this predetermined period of time, current flowing through the resistors 92, 97 turns on the transistor 98, so inhibiting the transistor 78 from conduction. At the end of the predetermined period of time, the transistor 91 turns on again, and so the transistor 98 turns off, removing the inhibition from the transistor 78. Thus, if the predetermined deceleration is exceeded during the predetermined period of time, the brakes will not be released. Since the frequency with which the brakes are released on a cobbled surface is much higher than the frequency with which the brakes would be released during a normal braking operation when the wheel is likely to skid, the predetermined period of time can readily be chosen such that if the wheel is on a good surface and is about to skid, then by the time the predetermined deceleration has been exceeded for the second time, the capacitor 96 will have been discharged and so the transistor 91 will be on and the transistor 98 off so that brakes can be released again. However, on a cobbled surface, an attempt will be made to release the brakes again well before the capacitor 96 has discharged, and in these circumstances the required inhibition will be effected by virtue of conduction of the transistor 98. It will be understood that a predetermined period of time can be chosen in the manner explained above, because it is a characteristic of skid cycle that the wheel is stable for a period which is sufficiently long to allow said predetermined period of time to be selected so that the circuit operates in the manner described. In other words, the timing operation starting from the cessation of severe wheel acceleration has no effect on the skid cycle.

It will of course be appreciated that the inhibition can be effected in other ways.

The way in which each wheel on the vehicle is controlled can vary from vehicle to vehicle. Thus, the circuits shown can be duplicated, so that there is s separate control for each wheel. Alternatively, there can be separate controls for the two front wheels, and separate control circuits for the rear wheels, but the control circuits for the rear wheels operating on a common solonoid so that the brakes are released simultaneously from both rear wheels. Various other combinations are possible, as will be appreciated.

I claim:

1. A braking system for a vehicle wheel, comprising in combination circuit means producing an output dependent upon the rate of change of rotational speed of said wheel, an amplifier coupled to said circuit means, said amplifier operating when the deceleration of the wheel exceeds a predetermined value to release the brakes from said wheel, an inhibiting circuit coupled to said circuit means, said circuit means providing a triggering input to said inhibiting circuit when the acceleration of the wheel exceeds a set value, delay means within said inhibiting circuit, said delay means holding said inhibiting circuit in a triggered condition for a predetermined period after said triggering input is removed, and means whereby said inhibiting circuit when in said triggered condition prevents release of said brakes by said amplifier.

2. A system as claimed in claim 1 in which said inhibiting circuit includes a transistor which is biased to conduction, said circuit means turning said transistor off when the acceleration of the wheel exceeds said set value, and said delay means comprising a capacitor associated with said transistor, said capacitor charging when said transistor is turned off, but maintaining the inhibiting circuit in its triggered condition for said predetermined period.

3. A braking system for a vehicle wheel, comprising in combination means producing an electrical signal representing the rotational speed of the vehicle wheel, a differentiating circuit to which said signal is applied, said differentiating circuit producing an output representing the rate of change of rotational speed of the wheel, an amplifier operable by the output from said differentiating circuit to release the brakes from the wheel when the rotational deceleration of the wheel exceeds a predetermined value, a transistor, circuit means biasing said transistor to conduction, means operable when said transistor is non-conductive for inhibiting said amplifier to prevent release of said brakes, a capacitor associated with said transistor, said transistor when conductive holding said capacitor discharged, but said capacitor charging when said transistor turns off, means coupling said transistor to said differentiating circuit, said differentiating circuit producing an output to turn said transistor off when the acceleration of said wheel exceeds a set value, said capacitor then charging, and said capacitor serving when said transistor is no longer biased off by the output from the differentiating circuit to hold said transistor off for a predetermined period of time.

* * * * *